(12) United States Patent
Tartaglia

(10) Patent No.: US 8,486,560 B2
(45) Date of Patent: Jul. 16, 2013

(54) BATTERY PACK THERMAL PROTECTION FROM HEAT STERILIZATION

(76) Inventor: Steven Tartaglia, Safety Harbor, FL (US)

( * ) Notice: Subject to any disclaimer, the term of this patent is extended or adjusted under 35 U.S.C. 154(b) by 378 days.

(21) Appl. No.: 12/789,597

(22) Filed: May 28, 2010

(65) Prior Publication Data
US 2011/0293997 A1    Dec. 1, 2011

Related U.S. Application Data

(63) Continuation-in-part of application No. 12/786,473, filed on May 25, 2010.

(51) Int. Cl.
*H01M 2/02* (2006.01)
(52) U.S. Cl.
USPC ............ 429/178; 429/149; 429/159; 429/163
(58) Field of Classification Search
USPC ........................... 429/100, 149, 159, 163, 178
See application file for complete search history.

(56) References Cited

U.S. PATENT DOCUMENTS

| | | | |
|---|---|---|---|
| 5,601,942 A * | 2/1997 | Fedele | 429/159 |
| 6,756,766 B2 | 6/2004 | Miller | |
| 2002/0182480 A1 | 12/2002 | Hanauer et al. | |
| 2006/0105233 A1* | 5/2006 | Morita | 429/162 |
| 2007/0009787 A1 | 1/2007 | Straubel et al. | |
| 2008/0038628 A1* | 2/2008 | Yamauchi et al. | 429/56 |
| 2008/0113262 A1 | 5/2008 | Phillips et al. | |
| 2008/0241675 A1 | 10/2008 | Enari et al. | |
| 2009/0305125 A1* | 12/2009 | Kosugi et al. | 429/149 |
| 2011/0100036 A1* | 5/2011 | Farmer | 62/101 |

* cited by examiner

*Primary Examiner* — Mark F Huff
*Assistant Examiner* — Monique M Wills
(74) *Attorney, Agent, or Firm* — Larson & Larson, P.A.; Frank Liebenow; Justin P. Miller

(57) ABSTRACT

An application for a battery pack that includes a set of walls made of sturdy material, power interface terminals and battery cells/electronics held within the walls. The battery cells are separated from the walls by a highly insulating material, thereby reducing the temperature that the battery cells reach during heat sterilization cycles performed on the battery pack after, for example, exposure of the battery pack to pathogens.

17 Claims, 3 Drawing Sheets

BATTERY PACK THERMAL PROTECTION FROM HEAT STERILIZATION

CROSS-REFERENCE TO RELATED APPLICATION

This is a Continuation-in-part of U.S. patent application titled "BATTERY CUSHION AND INSULATOR," Ser. No. 12/786,473, inventor Steven Tartaglia, filed May 25, 2010.

FIELD

This invention relates to the field of batteries and more particularly to a system for insulating battery cells situated within battery packs from external heat introduced during thermal sterilization.

BACKGROUND

Battery cells such as flooded lead-acid, absorbed-glass-matt (AGM), lead-acid, Nickel Cadmium (NiCd), Nickel Metal Hydride (NiMh) and the like perform best at certain temperature ranges and are easily damaged when exposed to very high temperatures. When such battery cells, either standalone or within a battery pack, are exposed to certain high temperatures, various physical changes occur internal to the battery cells such as boiling of the electrolyte, etc. In an extreme case, such as boiling of the electrolyte, high pressure results within the sealed cell, leading to possible deformation of the outer case, deformation of the anode/cathode arrangements and, possible out-gassing or leakage of electrolyte, the later of which resulting in a totally useless cell.

Many hospital or surgical related devices use battery packs, providing enhanced range of motion to surgeons and reducing the chance of a power cord finding its way into a bad location. There are many examples of such devices for drilling into bone, sawing bone, screwdrivers, making incisions, etc. These devices use battery packs that attach to the devices and provide power during, for example, an operation such as an orthopedic operation. In most systems, the battery pack is removable for charging in a charging station.

A recent search indicates that many battery packs for such devices contain the heavy metal cadmium, Cd. The labels of these batteries show the chemical symbol, Cd, along with a crossed-out trash can, meaning that these batteries are not to be disposed of in ordinary trash due to land, water table and air pollution from landfills or incinerators. Notwithstanding, the cost for such battery packs are around $150-$400 for a used pack and $300-$500 for a new pack.

Some battery packs for medical devices are single-use, in that after usage, the entire pack is discarded. This creates a dilemma because the battery packs are often exposed to body fluids, making them a bio-hazard. Bio-hazard material is often incinerated to neutralize the hazard, but most batteries cannot be incinerated due to pollution and/or explosion issued. Therefore, the battery packs should not be placed in bio-hazard disposal containers, yet, since they are now bio-hazardous, the exposed battery packs cannot be disposed in normal recycle locations.

Many battery packs are rechargeable and reusable, much like a battery pack for a home cordless drill. After use and before the next usage, the device and the battery packs must be sterilized to kill any pathogens present on surfaces and in cracks, etc. To sterilize a rechargeable battery pack, per one exemplary manufacturer's procedure, the device is separated from the battery pack and any debris or accumulation is cleaned. Next, sterilization is performed through an Autoclave Cycle. Autoclave cycles are, for example, 132° C.-137° C. for at least 15 minutes then 5 minutes drying time or 15 minutes of pre-heating, 132° C.-137° C. for at least 10 minutes, then 5 minutes drying time. Such cycles, although hard on mechanical devices such as motors, usually do not severely affect the life of the actual devices. Unfortunately, these heat cycles often severely affect the life of the battery packs. For example, nickel cadmium battery packs are known to severely degrade after such sterilization cycles. A battery pack that normally would function well after 200 charge/use cycles (at normal ambient temperatures) is only useful for around six charge/use cycles after being sterilized at such temperatures and periods of time. Furthermore, even though it is usable for six cycles, the amount of charge such a battery pack will hold after heat sterilization is severely decreased, often requiring swapping of battery packs during an operation.

Newer, ecology minded technologies such as lithium ion (Li-ion) and Lithium Ion (Li fe) normally provide more use/charge cycles than nickel cadmium, but are even more susceptible to issues related to high temperatures. In, for example, Lithium Ion battery cells, the thin Solid Electrolyte Interface (SEI) layer on the anode breaks down due to overheating caused by excessive currents, overcharging or high temperatures. The breakdown of the SEI layer starts to occur at the relatively low temperature of 80° C. Once the SEI layer is breached, the electrolyte reacts with the carbon anode at a higher, uncontrolled, temperature, creating an exothermal reaction which drives the temperature up still further. Therefore, it is important to assure that the core temperature of Lithium Ion cells remains well under 80° C., preferably under 75° C.

It is recommended to store nickel cadmium battery cells at less than 45° C. and temperatures above this "can" cause the alkaline electrolyte to leak out. Storage of nickel cadmium, lithium-Fe—S and Lithium-Mg—O at temperatures above 60° C. violates most manufacturers' recommendations and many warranties.

Unfortunately, when heated in an Autoclave to a temperature between 132° C. and 137° C., most battery cells will fail. Because each cell has an initial temperature and mass and the case, usually ABS plastic, has minor insulating ability, exposure to a temperature between 132° C. and 137° C. does not mean that, after 10, 20 or 30 minutes of exposure, the internal temperature will reach between 132° C. and 137° C., but it will likely be well over 80° C., thereby permanently damaging, for example, lithium ion battery cells.

What is needed is a battery pack that is suitable for sterilization in an Autoclave at sterilization temperatures for long enough periods of time as to properly sterilize the battery pack while preventing damage to the internal battery cell(s).

SUMMARY

A battery pack is disclosed including a set of walls made of sturdy material, power interface terminals and battery cells/electronics held within the walls and separated from the walls by a highly insulating material.

In one embodiment, a battery pack is disclosed including an enclosure with one or more battery cells held within the enclosure. An insulative layer separates the battery cells from an inside wall of the enclosure. A connection terminal is on or in an outside wall of the enclosure and two or more conductors connects the connection terminal with two or more terminals of the battery cells, the conductors pass through the insulative layer.

In another embodiment, a method of reducing battery cell failure during heat sterilization is disclosed including providing one or more battery cells, the battery cells being interconnected (series, parallel or series-parallel) to provide power to a device. The battery cells are surrounded in an insulative layer and connected to connection terminals by a plurality of conductors, the conductors passing through the insulative layer. The battery cells and the insulative layer are enclosed into a battery pack in which the connection terminals are accessible from outside of the battery pack. In this battery pack, the battery cells are insulated from heat applied to the battery pack during heat sterilization during a heat sterilization cycle, maintaining a safe temperature at the battery cells.

In another embodiment, a battery pack is disclosed including an enclosure that holds two or more battery cells. Conductive paths interconnect battery terminals of the battery cells in series, parallel or series-parallel configurations. An insulative layer separates the battery cells from an inside wall of the enclosure to reduce heat transfer from outside of the enclosure into the batteries during heat sterilization. A connection terminal that has electrical contacts is on or molded into the enclosure so that the electrical contacts are accessible from outside of the enclosure. Two or more conductors connect each of the electrical contacts of the connection terminal to a first terminal of a thermal breaker and two or more conductors connect a second terminal of the thermal breaker to the battery cells.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION

Figure 1:
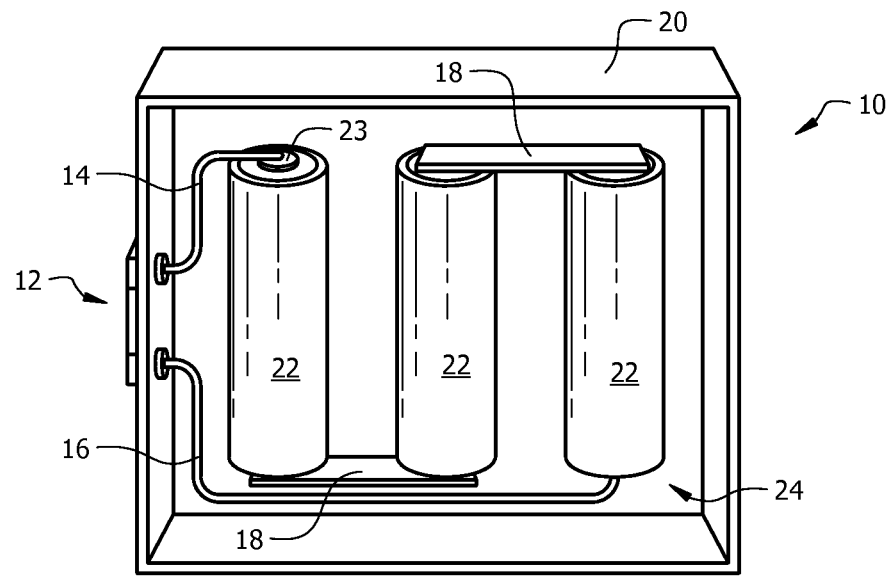
FIG. 1 illustrates a perspective view of a typical battery pack of the prior art.

Reference will now be made in detail to the presently preferred embodiments of the invention, examples of which are illustrated in the accompanying drawings. Throughout the following detailed description, the same reference numerals refer to the same elements in all figures.

Referring to FIG. 1, a perspective view of a typical battery pack 10 of the prior art will be described. Typical battery packs 10 have a plastic enclosure 20, usually made of Acrylonitrile butadiene styrene otherwise known as ABS. Within the plastic enclosure 20 are one or more battery cells 22 connected in series, parallel or series/parallel by interconnecting conductive paths 18, typically flat metal sheets that are tack-welded to battery terminals. One or more battery terminals 23 are connected to a power connection terminal 12 by wires 14/16 or other conductive paths for the delivery of power to a device and for the charging of the battery cells 22.

Although not shown, for completeness, often such battery packs 10 include other devices such as electronic circuits that prevent over current, over voltage, under voltage, control charging, prevent over-temperature situations during charging, etc. All such devices are known and present in some battery packs, but have been left out for clarity reasons.

Although the size of the plastic enclosure 20 is shown exaggeratedly larger than needed, it is known that inside surfaces of such cases 20 often directly touch the battery cells 22 to support the battery cells 22. It is also known that an air gap 24 separates the battery cells 22 from the inside surface of the plastic enclosure 20 in places where no contact is made.

When such a battery pack 10 is placed in a sterilizing chamber such as an Autoclave during a sterilization cycle, external temperatures rise to a temperature between 132° C. and 137° C. The internal battery cells 22 will approach the external temperature gradually depending upon the initial temperature of the battery cells, the mass of the battery cells and the thermal resistance between the exterior of the battery pack 10 and the battery cells. Since plastic, in particular ABS plastic, is not a good thermal insulator, the ambient temperature of between 132° C. and 137° C. quickly conducts through the plastic enclosure 20 and into the battery cells 22 that are in direct contact with the plastic enclosure 20. Soon after, battery cells 22 that are not touching the plastic enclosure 20 (e.g. battery cells 22 that are surrounded by other battery cells 22) are heated by heat that is conducted through the battery cells 22 that are in contact the plastic enclosure 20 and internal air 24 that is also heated by the plastic enclosure 20. Furthermore, the 132° C. to 137° C. ambient temperature heats the contacts and heat is conducted over the electrical conductors 14/16 and into several of the battery cells 22. Since the thermal resistance of the battery pack 10 is low, the internal battery cells 22 approach the external temperature of 132° C. and 137° C. during the sterilization cycle. During standard sterilization cycles, the temperature of the battery cells 22 exceed maximum allowable battery cell temperatures, damaging or destroying some or all of the battery cells 22. For example, most lithium ion battery cells 22 begin to deteriorate or are destroyed at 80° C.

Figure 2:
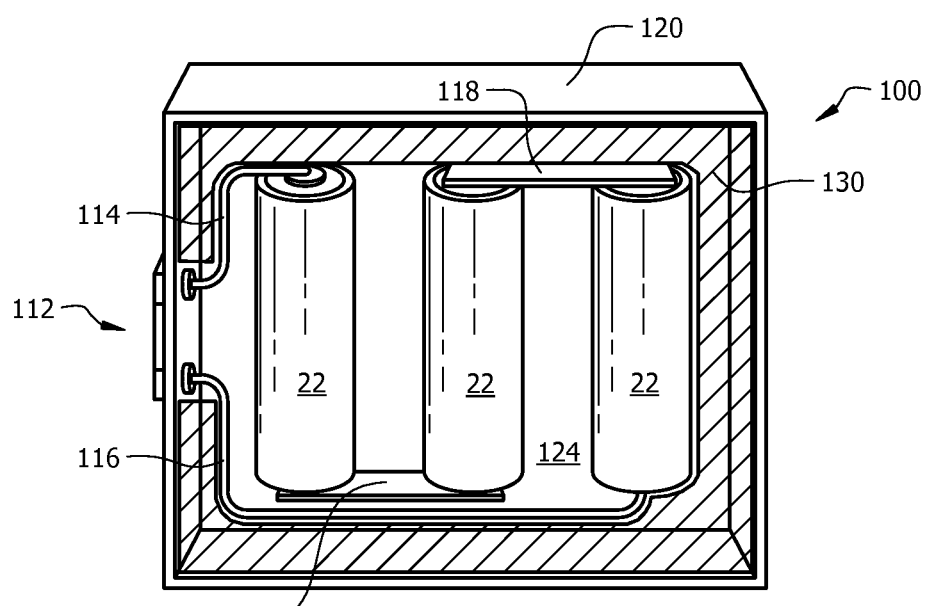
FIG. 2 illustrates a perspective view of a battery pack with insulated battery cells.

Referring to FIG. 2, a perspective view of a battery pack 100 with insulated battery cells 22 will be described. The new battery packs 100 has a plastic enclosure 120, made of any known plastic such as ABS, but preferably a heat resistant plastic such as Ultem from GE plastics. Within the plastic enclosure 120 are one or more battery cells 22 connected in series, parallel or series/parallel by interconnecting conductive paths 118, typically flat metal sheets that are tack-welded to battery terminals. Any known or future battery chemistry is anticipated including, but not limited to, alkaline, lead acid, nickel cadmium, nickel metal hydride, lithium, lithium ion, mercury, lithium iron, etc.

One or more battery terminals 123 are connected to a power connection terminal 112 by wires 114/116 or other conductive paths for the delivery of power to a device and for the charging of the battery cells 22.

The inside surfaces of the enclosure 120 are separated from the battery cells 22 by a heat insulating material 130. The heat insulating material 130 replaces much of the air gap 24 of the prior art. When such a battery pack 100 is placed in a sterilizing chamber such as an Autoclave, external temperatures quickly rise to a temperature between 132° C. and 137° C. The ambient temperature of between 132° C. and 137° C. quickly conducts through the plastic enclosure 120 but is retarded from reaching the battery cells 22 by the insulating material 130. The heat insulating material 130 greatly reduces conduction of heat into the battery cells 22, thereby enabling long sterilization cycles at a temperature between 132° C. and 137° C. while maintaining battery cell 22 temperatures of well under 80° C. during the entire heat sterilization cycle. In testing, using the appropriate heat insulating material 130, internal battery cell 22 temperature has been measured at a maximum of 62° C. The contacts still absorb heat and conduct the heat over the electrical conductors 114/116 and into several of the battery cells 22, but this amount of heat is minimal compared to the heat conducted through the plastic enclosure 20 of the prior art. For example, by maintaining an internal battery cell 22 temperature of less than 62° C., most lithium ion battery cells 22 fully survive the standard sterilization process.

There are many known insulating materials 130 such as fiberglass, Styrofoam, wool, etc. Any such material is anticipated in the insulating layer 130, but several materials provide excellent insulating properties in such tight spaces. In preferred embodiments, the insulating layer 130 is made of silica (silicon dioxide) or silica ceramic carbon nitride, either solid, woven, fibers or in other forms. This is the material used in the tiles that insulate the space shuttle during the high heat exposure during re-entry into the earth's atmosphere.

Another preferred material for the insulating layer 130 is Aerogel, preferably silica aerogel. Aerogels are good thermal insulators because they almost nullify the three methods of heat transfer (convection, conduction, and radiation). As for conductive insulators, Aerogels are composed almost entirely from a gas, and gases are very poor heat conductors. Silica aerogel is especially good because silica is also a poor conductor of heat. Because air cannot circulate through the lattice of aerogels, aerogels are very good convective insulators. Aerogels are good radiative insulator, especially when carbon is added because carbon absorbs the infrared radiation that transfers heat at standard temperatures. The most insulative aerogel is silica aerogel with carbon added to it.

Although not shown, for completeness, often such battery packs 100 include other devices such as electronic circuits that prevent over current, over voltage, under voltage, control charging, prevent over-temperature situations during charging, etc. All such devices are known and present in some battery packs, but have been left out for clarity reasons.

Figure 3:
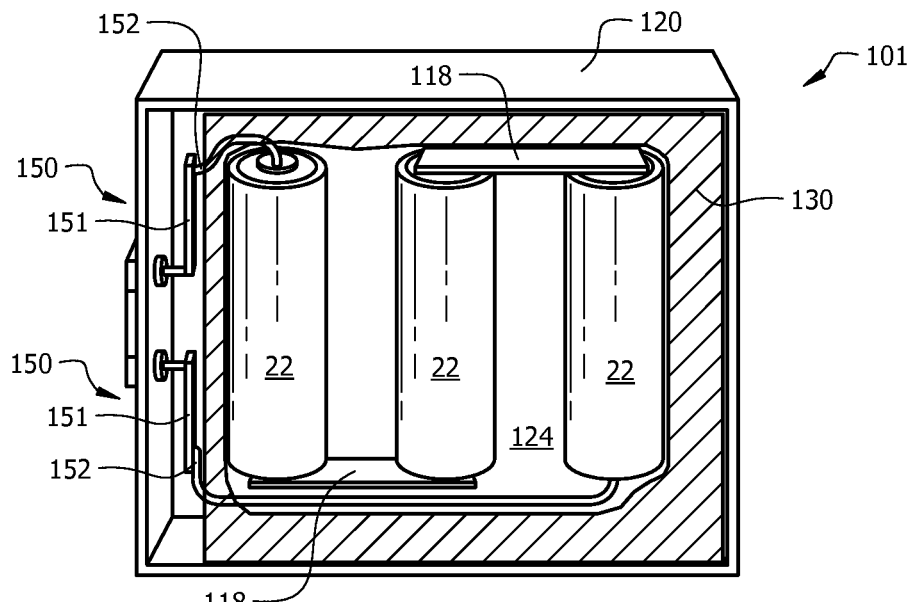
FIG. 3 illustrates a perspective view of a battery pack with insulated battery cells with thermal conductive breakers.

Referring to FIG. 3, a perspective view of a battery pack 101 with insulated battery cells 22 with thermal conductive breakers 150 will be described. Although the battery pack 100 with the insulating layer 130 performs well in most heat sterilization procedures, some heat conducts from the contacts 12 and through the conductors 114/116 and into the battery cells 22. To reduce the conducted heat, the battery pack 101 includes thermal breakers 150 that thermally disconnect the internal battery cells 22 from the terminals at a predetermined temperature. The thermal breakers 150, for example, include bi-metallic strips 151 formed of a sandwich of two dissimilar metals that have different coefficients of expansion. At room temperature (e.g. less than 25° C.), both metals are of the same length. As the temperature of the bi-metallic strip 151 increases, for example, to 40° C., one of the metals expands more than the other, causing the bi-metallic strip 151 to bend outwardly away from the thermal breaker contacts 152. Once the bi-metallic strip 151 bends away from the thermal breaker contacts, heat from the ambient is no longer conducted from the ambient, through the contacts 112 and through the conductors 114/116, thereby reducing thermal buildup in the internal battery cells 22. Such bi-metallic strips 151 are known for use in thermal cutoffs and circuit breakers. In this use, the bi-metallic strip 151 must carry sufficient current without heating to a point at which it opens the electrical contact between the bi-metallic strip 151 and the thermal breaker contacts 152.

Figure 4:
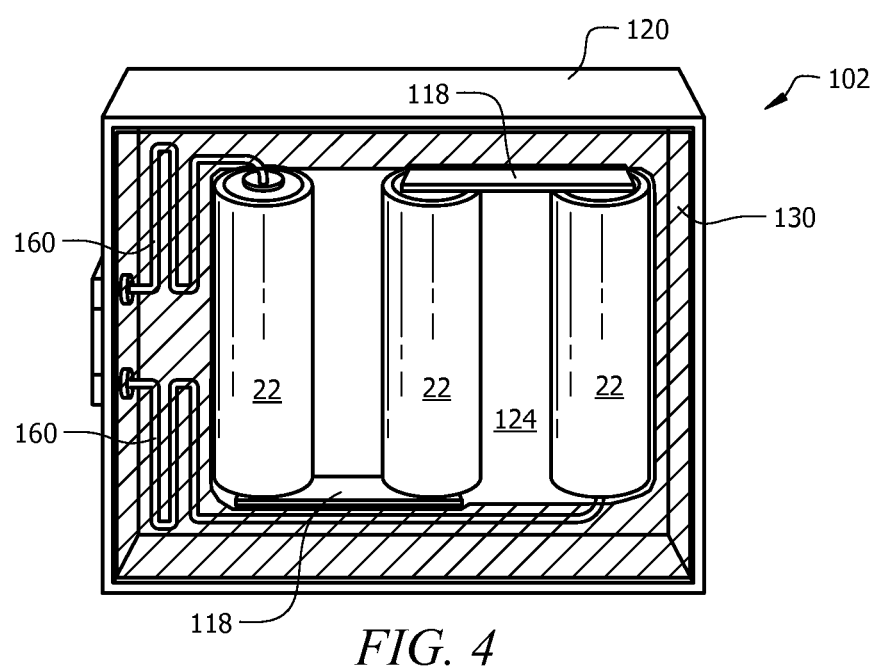
FIG. 4 illustrates a perspective view of a battery pack with insulated battery cells with thermal resistance.

Referring to FIG. 4, a perspective view of a battery pack 102 with insulated battery cells 22 and with thermal resistance 160 will be described. In order to reduce and/or delay the conduction of heat from the terminals 112 through the conductors 114/116 and into the internal battery cells 22, the path length of the conductors 114/116 is increased, thereby since thermal transfer is inversely proportional to length, thermal transfer from the terminals 112 through the conductors 114/116 and into the internal battery cells 22 is reduced.

Figure 5:
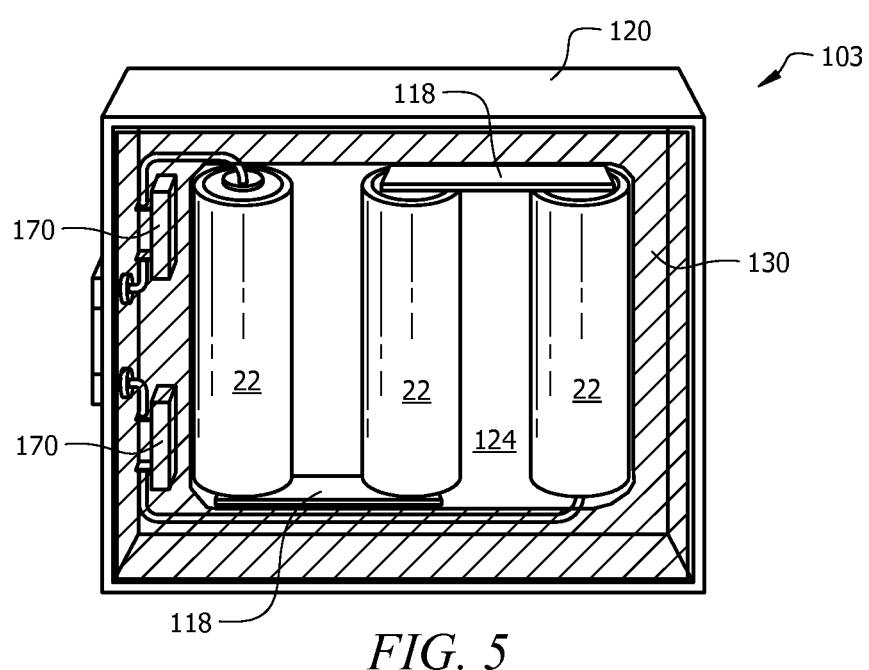
FIG. 5 illustrates a perspective view of a battery pack with insulated battery cells with thermal heat absorbing mass.

Referring to FIG. 5, a perspective view of a battery pack 103 with insulated battery cells 22 with thermal heat absorbing mass 170 will be described. In order to reduce and/or delay the conduction of heat from the terminals 112 through the conductors 114/116 and into the internal battery cells 22, a heat absorbing mass 170 is inserted in the path of the conductors 114/116. Since any mass absorbs calories of heat to increase its internal heat before passing that heat on, the heat absorbing masses 170 perform as heat sinks or thermal capacitors, taking time to heat before passing heat through the conductors 114/116 and into the internal battery cells 22. Once subject to high ambient heat, the terminals 112 heat rapidly and the heat begins to conduct into the thermal masses 170. Since it takes time for the temperature of the thermal masses 170 to increase, proportional to their mass, thermal transfer from the terminals 112 through the conductors 114/116 and into the internal battery cells 22 is reduced.

It is anticipated that an improved battery pack 100 include the insulative layer 130 along with any or none of the improved terminal thermal management devices (thermal breaker 150, thermal resistance 160 or thermal mass 170).

Equivalent elements can be substituted for the ones set forth above such that they perform in substantially the same manner in substantially the same way for achieving substantially the same result.

It is believed that the system and method as described and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A battery pack comprising:
   an enclosure;
   one or more battery cells held within the enclosure;
   a thermally insulative layer separating the battery cells from an inside wall of the enclosure, the thermally insulative layer comprises silica aerogel;
   a connection terminal electrically accessible from outside of the enclosure;
   two or more conductors, each conductor connecting a contact of the connection terminal with a terminal of one or more of the battery cells.

2. The battery pack of claim 1, wherein the one or more battery cells is two or more battery cells and the battery pack further comprises interconnecting conductive paths, each interconnecting conductive path connecting battery terminals of the batteries in series, parallel or series-parallel.

3. The battery pack of claim 1, wherein the thermally insulative layer further comprises carbon.

4. The battery pack of claim 1, further comprising thermal breakers electrically and thermally in series between the connection terminals and the battery cells.

5. The battery pack of claim 4, wherein the thermal breaker comprises a bi-metallic strip and a thermal breaker contact, the bi-metallic strip normally in contact with the thermal breaker contact until the bi-metallic strip is heated to a predetermined temperature at which, the bi-metallic strip deforms and disconnects both electrically and thermally from the thermal breaker contact.

6. The battery pack of claim 1, further comprising a thermal resistor, the thermal resistor in series between the connection terminals and the battery cells, the thermal resistor being a conductor that is longer in length than a length required to connect the connection terminals with the battery cells.

7. The battery pack of claim 1, further comprising thermal masses, the thermal masses thermally interfaced to each of the conductors that connect the connection terminals and the battery cells, the thermal masses sinking a portion of the heat that is conducted from the connection terminals, thereby decreasing the amount of heat reaching the battery cells during thermal sterilization.

8. A method of reducing battery cell failure during heat sterilization, the method comprising:
    providing one or more battery cells within an enclosure, the battery cells interconnected to provide power to a device;
    insulating the battery cells by a thermally insulative layer, the thermally insulative layer separating the battery cells from an inside wall of the enclosure, the thermally insulative layer comprises silica aerogel;
    connecting the battery cells to connection terminals by a plurality of conductors, the conductors passing through the thermally insulative layer; and
    the connection terminals accessible from outside of the enclosure;
    whereby the battery cells are insulated from heat applied outside of the enclosure during a heat sterilization cycle, maintaining a safe temperature within the battery cells.

9. The method of claim 8, wherein the thermally insulative layer further comprises carbon.

10. The method of claim 8, wherein the step of connecting further comprises, the step of inserting thermal breakers electrically and thermally in series with the conductors between the connection terminals and the battery cells, the thermal breakers opening responsive to external heat conducted into the connection terminals during thermal sterilization.

11. The method of claim 10, wherein the thermal breaker comprises a bi-metallic strip and a thermal breaker contact, the bi-metallic strip normally in contact with the thermal breaker contact until the bi-metallic strip is heated to a predetermined temperature at which, the bi-metallic strip deforms and disconnects both electrically and thermally from the thermal breaker contact.

12. The method of claim 8, wherein the step of connecting further comprises, the step of inserting a thermal resistor in series with the conductors between the connection terminals and the battery cells.

13. The method of claim 12, wherein the step of connecting further comprises, the step of attaching thermal masses to the conductors that connect the connection terminals and the battery cells, the thermal masses sinking a portion of the heat that is conducted from the connection terminals, thereby decreasing the amount of heat reaching the battery cells during thermal sterilization.

14. A battery pack comprising:
    an enclosure;
    two or more battery cells held within the enclosure;
    conductive paths interconnect battery terminals of the battery cells in series, parallel or series-parallel configurations;
    an thermally insulative layer separates the battery cells from an inside wall of the enclosure, the thermally insulative layer comprises silica aerogel;
    a connection terminal that has electrical contacts, the electrical contacts accessible from outside of the enclosure;
    a thermal breaker electrically connected between each of the electrical contacts and a corresponding terminal of the battery, the thermal breakers opening responsive to reaching a predetermined temperature as heat conducts to the thermal breakers from the electrical contacts.

15. The battery pack of claim 14, wherein the thermally insulative layer further comprises carbon.

16. The battery pack of claim 14, wherein the thermal breaker comprises a bi-metallic strip electrically and thermally connected to the first terminal and a thermal breaker contact electrically connected to the second terminal, the bi-metallic strip normally in contact with the thermal breaker contact until the bi-metallic strip is heated to a predetermined temperature at which, the bi-metallic strip deforms and disconnects both electrically and thermally from the thermal breaker contact.

17. The battery pack of claim 14, further comprising thermal masses, the thermal masses thermally interfaced to one or more of the conductors, the thermal masses sinking a portion of the heat that is conducted from the connection terminals, thereby decreasing the amount of heat reaching the battery cells during thermal sterilization.

* * * * *